United States Patent [19]

Fulde et al.

[11] 4,448,791
[45] May 15, 1984

[54] BROWNABLE DOUGH FOR MICROWAVE COOKING

[75] Inventors: Roland C. Fulde, Cherry Hill; Stanley H. Kwis, Pennsauken, both of N.J.

[73] Assignee: Campbell Soup Company, Camden, N.J.

[21] Appl. No.: 323,086

[22] Filed: Nov. 19, 1981

[51] Int. Cl.³ .......................................... A21D 13/00
[52] U.S. Cl. .................................... 426/94; 426/243; 426/262; 426/275; 426/556; 426/132
[58] Field of Search ..................... 426/243, 19, 23, 94, 426/658, 653, 656, 262, 275, 556, 132

[56] References Cited

U.S. PATENT DOCUMENTS

| | | | |
|---|---|---|---|
| 3,738,841 | 6/1973 | Toscano | 426/19 |
| 3,792,173 | 2/1974 | Glabe | 426/92 |
| 4,252,832 | 2/1981 | Moody | 426/241 |
| 4,283,424 | 8/1981 | Bone | 426/94 |
| 4,306,133 | 12/1981 | Levinson | 426/243 |

FOREIGN PATENT DOCUMENTS

| | | | |
|---|---|---|---|
| 46-30772 | 9/1971 | Japan | 426/19 |
| 48-16179 | 5/1973 | Japan | 426/243 |

OTHER PUBLICATIONS

Lee et al., *Cereal Chemistry*, "Studies on the Brew Process ... Yeast Properties", vol. 36, Jan. 1959, pp. 1-18.
Pomeranz et al., "Effect of Various Sugars on Browning," 27 Journal of Food Science, 350, (1962).
Schrödter et al., "Characterization of Meat Aroma Concentrates with Different Aroma Notes," *Die Nahrung* 26, 7/8, 1982, pp. 625-631.

*Primary Examiner*—Joseph M. Golian
*Assistant Examiner*—Elizabeth A. Hatcher
*Attorney, Agent, or Firm*—Banner, Birch, McKie & Beckett

[57] ABSTRACT

This invention provides a reactive dough composition which undergoes chemical surface browning upon exposure to microwave energy. This reactive dough composition is preferably incorporated as a coating layer on frozen food products having a crust component, e.g., pies. The resulting food product can be heated or cooked in a microwave oven to give a cooked product which is comparable or superior in color and flavor to fresh products baked in a conventional oven. The reactive composition contains as the essential active ingredients a reducing sugar such as dextrose and an amino acid source such as a yeast extract.

12 Claims, No Drawings

BROWNABLE DOUGH FOR MICROWAVE COOKING

TECHNICAL FIELD

The present invention relates to a product which facilitates the cooking of foodstuffs in a microwave oven. More particularly, this invention relates to a brownable pastry or pie dough to facilitate microwave cooking of products which contain an unbaked pastry crust.

BACKGROUND OF THE INVENTION

The use of microwave energy to cook food products has gained great popularity and can be used with great speed and simplicity in the cooking of most food products. One very significant disadvantage of microwave cooking, however, is the absence of surface browning reactions with most food products. While simple expedients such as coating with sauces and the like may be effective to provide the desired coloring or browning to meat products and the like, these methods have not proven practicable for products which contain uncooked pastry crusts. In such a product, a true browning of the crust itself is required to make the cooked product acceptable to most consumers. While such a product may be adequately heated or cooked in a microwave oven, the resulting appearance severely limits its consumer acceptability.

Moody U.S. Pat. No. 4,252,832 discloses a syrup-like composition for use in coating food products to be cooked by microwaves. This syrup is said to effect a desired browning of various foods when cooked in a microwave oven, including frozen pies and pastries. The Moody composition comprises a disaccharide, water and preferably a minor amount of monosaccharide. Salt is optionally added to the composition to counteract the sweetness of the saccharides when such sweetness is undesirable. In view of current trends by consumers toward reduction of their intake of sugars and salts, it is generally undesirable to utilize browning agents having high concentrations of sugars and salt as contemplated by Moody.

In view of the wide variety of products which include unbaked pastry crusts, it would satisfy a significant and long standing need in the art if a dough composition could be formulated to exhibit normal browning reactions upon cooking of these products in a microwave oven.

DISCLOSURE OF THE INVENTION

Accordingly, it is an object of the present invention to render a large class of products suitable for microwave cooking which products heretofore were primarily cooked only in conventional ovens due to lack of browning reactions.

It is a further object of the present invention to provide a dough composition which undergoes browning reactions under the influence of microwave energy to yield cooked products having an aesthetically pleasing browned appearance.

In accordance with these and other objects which will readily occur to those skilled in the art, the present invention provides a reactive dough composition which undergoes chemical surface browning reactions upon exposure to microwave energy, said composition comprising a dough-base having added thereto, a reducing sugar and an amino acid source in amounts sufficient to promote said chemical surface browning reaction in the desired microwave exposure period.

The present invention also provides a composite dough material suitable for incorporation in food products as a pastry crust, said dough material comprising an unreactive dough substrate layer which does not brown upon exposure to microwave energy, said dough substrate layer having coated thereon, a uniform layer of reactive dough composition which undergoes chemical surface browning reactions upon exposure to microwave energy, which reactive dough composition comprises a dough-base having added thereto a reducing sugar and an amino acid source in amounts sufficient to promote said chemical surface browning reactions in the desired microwave cooking period.

The present invention further provides frozen food products which contain an unbaked pastry crust of the type described above, and methods for making the various compositions and products described above.

MODES FOR CARRYING OUT THE INVENTION

The compositions and products of the present invention find general utility in any foodstuffs which have as a component thereof a dough-based component or coating. By the term "dough" applicants tend to refer to all compositions generally based on mixtures of flour and water as that term is normally employed in the food technology field. Option dough ingredients include, but are not limited to, sugar, shortening, nonfat dry milk, salt, eggs, leavening agents, butter or margarine, flavoring and coloring. The compositions and products of the present invention find particular utility in the preparation of frozen food products which contain unbaked pastry or pie dough components. Examples of this kind of product include frozen pastry products or pies, such as meat pies and fruit pies. For convenience, the invention will be described hereinafter primarily with respect to a particular product—a crust for frozen pies. The description of this product and its methods of production will readily suggest to one skilled in the art how similar products and processes employing the compositions of the present invention may be employed.

There are two basic forms to the product aspects of the present invention. These comprise a reactive dough composition which is microwave brownable, and a composite dough structure or crust which comprises a substrate layer of conventional dough which exhibits little or no browning in a microwave oven coated with a uniform layer of the reactive brownable dough composition. While the reactive dough composition may be utilized alone without the dough substrate layer, the following description is directed primarily to the production of products which contain both the substrate layer and the reactive dough coating composition.

The nature of this substrate layer dough and its methods of preparation will be described first. In general, the substrate dough composition can comprise any of the well known dough materials conventionally used in the preparation of food products which include pie crusts or other pastry components. The components and proportions thereof are not critical except insofar as necessary to make a palatable product according to conventional formulating and processing techniques.

The basic ingredients of the substrate dough composition are flour, water and fat or shortening material. In general, any flour product conventionally employed in the food industry may be utilized in producing the base dough composition of the present invention. While wheat flour, optionally bleached, is preferred due to consumer preferences, other grain flours including mixtures thereof may similarly be utilized. The fat material may be any solid or liquid edible fat of either animal or vegetable origin. The term "shortening" as used hereinafter is intended to encompass all of the various animal or vegetable fat materials commonly employed for this purpose.

In addition to these basic ingredients, any of the commonly employed additives designed to modify properties of the composition such as color, flavor or texture or the like, may also be employed for conventional purposes in conventional amounts.

The relative proportions of the substrate dough formulation ingredients can vary widely depending on the nature of the product to be produced. Typically, dough formulations intended for products having pie crusts will contain flour in an amount of from about 30 to 60% by weight, preferably from about 45 to 55% by weight; shortening in an amount from about 25 to 40% by weight, preferably from about 25 to 35% by weight; and water in an amount from about 20 to 40% by weight, preferably about 25 to 30% by weight.

The proteins in wheat flour have a special property that, when hydrated with water and mixed into a dough, form a viscoelastic matrix known as "gluten." Proper gluten formation is dependent on the water-to-flour ratio. Excessive water in the dough mix results in a dough with no elasticity due to the breakdown of gluten during mixing. Insufficient water results in a mixture with poor or no gluten formation. The dough shortening (fat) affects crumb formation. Insufficient fat results in a crust with no flakiness. Excessive fat results in a crust too tender to handle.

The substrate dough composition useful according to the present invention may be prepared by any of a well known processing method. In general, these methods comprise combining the various ingredients followed by kneading or mixing to achieve a dough composition having proper uniformity and consistency.

Mixing of the various ingredients may generally be carried out in any manner known to those skilled in the art. The dough mixing can be carried out in any commercially available mixing equipment, such as a Hobart paddle mixer or in a dough mixer equipped with a sigma blade kneader or dough mixer. The one-step ingredient mixing is immediately followed by multiple sheeting steps. More detailed descriptions of preferred methods of preparing such dough compositions are set out in the Examples.

The substrate dough layer produced according to the present invention is referred to by the industry as a bottom crust "mealy" type dough mix. This type of crust typically contains approximately 50% shortening; that is, 50% as much shortening as flour by weight. This dough is considered a medium-to-low flaking crust due to the reduced quantity of shortening. An "extra flaky" crust would contain 100% shortening, i.e., relative to weight of flour. An extra flaky crust could be used as the substrate dough if desired. However, this dough is fragile and it would have to be sheeted by hand rolling exclusively. When placed over a frozen meat pie which is then baked in a conventional oven at 425° for 45 minutes, the dough will crust and develop a golden brown color. This dough will crust during microwave cooking but it will not brown.

The nature of the reactive dough composition will now be described. The essential reactive components of the brownable dough composition of the present invention are a reducing sugar and an amino acid source. Under conditions present in a microwave oven, the reducing sugar and amino acid containing material chemically react at the surface of the dough composition to provide a browning reaction which changes the appearance of the dough to that of a dough product baked in a conventional oven. While not wishing to be bound by any particular theory, applicants believe that the browning reaction that occurs in the reactive dough is due primarily to the heating of the reducing sugar in the presence of amino acids. This type reaction is referred to as the "Maillard Reaction." The rate of this browning reaction is dependent on a number of factors such as temperature, pH, concentration, water activity, oxygen supply and the nature of the raw materials.

The amino acid source useful according to the present invention is any material which contains or provides sufficient amino acid content to undergo the desired chemical browning reaction with dextrose in the microwave energy environment. Among the suitable amino acid sources are hydrolyzed plant proteins and yeast derivatives such as yeast autolysates or yeast extracts. One preferred amino acid source is a yeast extract produced by heating yeast concentrates to promote enzymatic autolysis of the proteins present to amino acids. The yeast concentrates or extracts produced from these concentrates can be used in the reactive dough compositions of the present invention. Commercially available yeast extracts generally contain from about 15% to over 50% free amino acids, depending on specific processing conditions. Typically, these yeast extracts can contain from about 65% to 80% solids.

The other essential reactive component of the dough composition of the present invention is a reducing sugar. The reducing sugar component can comprise any of the known reducing sugars such as dextrose (e.g., from corn syrup), maltose, fructose and the like or mixtures thereof. The rate of browning during microwave cooking may vary somewhat depending on the particular reducing sugar employed.

The above-described essential reactive components can be incorporated in any suitable dough-based composition. The dough material preferably contains flour, water and a fat or shortening. It is possible, and often preferred, to use the same dough ingredients for the reactive dough composition as used in the unreactive substrate dough described above, although the relative proportions of the ingredients may be varied in the two different layers. Other dough compositions, however, may similarly be employed and may vary widely in properties depending on the nature of the product to be produced. Moreover, any of the normally employed additives used in dough formulations may be incorporated in the reactive dough composition of the present invention as long as they do not adversely affect the chemical browning reaction. For example, additives which affect the flavor, color and/or aroma of baked products may be employed in the conventional fashion. Salt may be optionally added in a minor amount to enhance the taste characteristics of products produced with the reactive dough compositions of the present invention.

In the reactive dough composition of the present invention, the relative proportions of the various components can vary widely depending on the nature of the product employing this composition. It is necessary, however, for the reducing sugar and amino acid components to be present in an amount which is sufficient to effect the chemical reactions which cause surface browning of the material. A typical reactive dough composition according to the present invention will contain at least about 0.4% by weight of the reducing sugar component. In general, the reaction stoichiometry is such that, at a minimum, yeast extract should be present at a level which will provide a ratio of reducing sugar solids to yeast extract solids of from about 1:1 to 1:10.

To effect the browning reaction, yeast extract typically should be present by weight in amounts of at least about 0.5% (solids), and preferably the yeast extract is employed at concentration levels of from about 4 to 18% with most preferred levels being in the range of about 7 to 13%. When an amino acid source other than yeast extract is employed, the ratios and amount described herein can be adjusted up or down based on the amount of available amino acids present. Applicants have found that the time necessary to achieve the chemical browning reaction is in part dependent on the yeast extract concentration in the reactive dough composition. In general, the higher the yeast extract content the faster the browning reaction proceeds. Selection of proper yeast extract levels also can be influenced by the conditions of the microwave baking. For example, at lower yeast extract concentrations applicants have found that complete microwave browning can be achieved in the allotted cooking time of about 8 minutes only when the cooking is accomplished in a sealed airtight product container. Products having intermediate levels of yeast extract (about 5 to 10% by weight) may be browned in about 8 minutes utilizing a non-airtight product container. If the yeast extract content is increased further to about 13% or more, the product will rapidly brown without the need for any product cover. It appears that the cover maintains a high level of moisture which is necessary for the browning reactions. In the case of the higher levels of yeast extract, the reactions occur before the moisture is driven out of the crust.

Depending on the desired characteristics of the reactive dough composition, the relative proportions of flour, water and shortening may vary widely. In the preferred embodiment, the reactive dough composition is formulated to provide a material which can be conveniently coated, for example, by brushing, spraying and the like onto a previously formed substrate dough composition having sufficient structural integrity to allow sheeting and pie assembly in the conventional fashion. Accordingly, the reactive dough composition of the present invention can contain from about 25 to 45%, preferably from 35 to 40% flour, from about 20 to 40%, preferably from about 25 to 30% shortening, and from about 25 to 40%, preferably from about 30 to 35% water.

In order for the final cooked product to exhibit the appropriate pastry-like characteristics, it is essential that the water content of the reactive dough composition be maintained in the range of from about 30 to 35% after formulation of the composition, especially if the product is frozen for subsequent use. The dehydrating atmosphere present in a freezer substantially reduces the moisture content of a frozen product exposed to this environment. If means are not taken to keep the moisture content in the desired range, the texture and browning of the crust will be significantly impaired. Protection can be achieved by placing products containing the reactive dough composition of the present invention in sterilized hermetically sealed packages.

In general, any method which will suitably produce a stable homogenous mixture of the above-described dough components can be utilized to prepare the reactive dough compositions of the present invention. Preferably, the microwave reactive dough composition described above is maintained at a reasonably low temperature during its formation. In general, temperatures in the range of from about 50° to 70° F. and preferably about 50° to 60° F. should be maintained throughout the dough composition formulation. One suitable way of facilitating this low temperature mixing is to use recipe water which has previously been chilled to about 50° F. Additional cooling can be effected by chilling the other ingredients of the mixture prior to their combination. The Examples illustrate preferred methods of forming these mixtures.

The reactive dough composition of the present invention is not a typical dough by industry standards. While reactive dough ingredients can be admixed in any conventional dough mixer, certain high water compositions of this dough cannot be conventionally sheeted.

One preferred method of utilizing the reactive dough composition described above is to prepare an unbaked pastry crust material which includes a layer of the reactive dough composition coated on a layer of the above-described substrate dough. This laminated or composite product may be prepared before or after incorporation of the substrate dough layer into a food product such as a pie. In general, the relative proportions of substrate dough to reactive dough in the composite product of the present invention may vary widely depending on the nature of the product in which this composite will be employed. Since the reactive dough composition exhibits only a surface browning reaction, practical considerations lead away from using excessively thick coatings of this composition. Accordingly, it is preferred to provide a relatively thin uniform coating of reactive dough material on the substrate dough. The substrate dough layer imparts the major taste and structural characteristics to the pastry crust. The substrate dough layer thickness, therefore, is dictated by the nature of the product being produced. In the case of pastry crusts for pies and the like, such a substrate layer will typically range in thickness from about 1.5 to 3.5 mm and preferably about 2.0 to 3.0 mm. For this type of product, the reactive dough composition layer may vary from about 0.1 to 1.5 mm and preferably from about 0.3 to 1.0 mm. In general, the ratio (by weight) of substrate dough to reactive dough can vary anywhere from about 3:1 to 6:1, and preferably is in the range of about 3:1 to 4:1.

Preparation of the laminated or composite material of the present invention first involves the step of providing a substrate dough layer. This layer can be formed by conventional techniques including rolling and sheeting to achieve the desired thickness followed by cutting, stamping and the like to give the product the desired shape. It is, of course, possible, and in many cases desirable, to form the laminate of the present invention prior to any final cutting or shaping to fit individual products. After the substrate layer has been prepared, and optionally applied to the food product, the next step of the process of the present invention comprises coating the substrate dough layer with a thin uniform layer of the reactive dough composition of the present invention. The nature of this coating process will depend largely on the nature and consistency of the reactive dough composition. In preferred formulations, this reactive dough composition can be applied to the substrate dough layer by spraying, brushing, rolling and the like. Techniques employed in performing this coating process are not critical; all that is required is the formation of a thin, uniform layer of the reactive dough.

In order to ensure that the composite dough product will not delaminate at the component interface, it is necessary to maintain the substrate dough at temperatures above about 50° F. during the coating step. Typically, the coating operation can take place with both component materials at a temperature from about 50° to 70° F. and preferably from about 50° to 60° F. The integrity of the composite material is also affected by the uniformity of the reactive dough layer. If the reactive dough composition is not evenly applied to the entire surface of the base dough, this composite crust tends to delaminate upon microwave baking. This separation can result in a surface having bubbled areas and low spots which possess a waxy or rubbery appearance.

The incorporation of a composite pastry crust according to the present invention into a typical food product (frozen pies) will now be described. In the preparation of frozen pie products, the first step involves the preparation and freezing of the pie filling in a container such as a pie tin. In the preferred manner of operation, the above-described substrate dough is then sheeted to appropriate thickness and a suitably shaped portion is placed on top of the frozen pie. The substrate dough can be trimmed and crimped against the lip of the side wall of the container to seal in the pie filling. In the next step of this process, a thin, uniform layer of the reactive dough composition of the present invention is brushed onto the upper surface of the substrate dough layer. The resulting product can then be uniformly frozen and maintained in the frozen state until immediately prior to cooking. Typically, the pies will be frozen to a uniform temperature which does not exceed 32° F. and preferably is in the range of about −10° to +10° F., with the most preferred freezing temperature being about −10° F. As described above, protection of the reactive dough composition from undesirable dehydration can be achieved if the pies are placed in sterilized hermetically sealed packages before freezing and storage. It is, of course, possible to prepare products containing the unbaked pastry crust of the present invention and cook them immediately without freezing or storage.

Frozen products according to the present invention containing the microwave brownable pastry crust components may be cooked in any microwave oven utilizing conventional time-temperature relationships which will vary depending on the nature and size of the frozen product. During microwave cooking the surface layer of the reactive dough undergoes the above-described crusting and browning chemical reactions. The substrate dough layer of the crust remains unaffected by microwave exposure and is merely heated and dehydrated to the moisture content of a freshly baked crust. The result is a pie crust which has the appearance, taste and texture of a crust which has been freshly baked in a conventional oven and which is markedly superior to conventional frozen pie crusts even when thawed and baked in a conventinal oven.

Microwave cooking of frozen foods containing unbaked pastry crusts of the present invention such as meat pies, can be enhanced by utilizing the microwave shield device described and claimed in commonly assigned copending U.S. patent application Ser. No. 323,067, entitled "Shield for Improved Cooking of Frozen Foods in a Microwave Oven," filed on even date herewith in the names of Stanley H. Kwis and Roland C. Fulde, and incoporated herein by reference.

It is, of course, possible to subject the unbaked pastry-containing products produced according to the present invention to cooking in conventional ovens. As a result of enhanced browning characteristics generally, conventional oven cooking times and temperatures of products produced according to the present invention can be reduced. For example, a conventional frozen meat pie requires cooking in a conventional oven for about 45 minutes at 425° F. The same product provided with the microwave brownable surface coating of the present inention may be similarly cooked in a conventional oven for about 35 minutes at 375° F. The resultant savings in time and energy are significant.

As described, the reactive dough composition of the present invention browns much more rapidly and to a greater extent when cooked in a container that can be covered, for example, with an ovenable film, paper plate, glass dish or closed box. In addition, the amount of yeast extract or other amino acid source added to the reactive dough can vary depending on the type of container cover used. For covers that form an airtight seal such as an ovenable paper film heat sealed to the paper tray lip or heavy glass cover, a yeast extract concentration of about 3 to 5% by weight generally is appropriate. Loose fitting covers, however, necessitate the addition of higher quantities of yeast extract to the reactive dough, i.e., in the range of about 5 to 10% by weight. Baking under moist conditions to effect crust browning, as occurs when pies are microwave baked in covered containers, has been found to be generally desirable when the reactive dough contains less than about 13.5% by weight of yeast extract. Increased circulation of the exhaust fan can reduce the humidity within the microwave cooking cavity and adversely affect the crust browning.

The following Examples are intended to illustrate more fully the nature of the present invention without acting as a limitation on its scope.

EXAMPLE 1

This Example demonstrates the preparation of a substrate dough composition suitable for incorporation into the composite product of the present invention. The following ingredients were chilled to an initial temperature of about 50° F.:

| Ingredient | Parts by Weights |
|---|---|
| Pie Dough Flour | 58.3 |
| Shortening (Colfax) | 27.1 |
| Water | 14.6 |

The pie dough flour and shortening were combined in a Hobart paddle mixer bowl and mixed for about 60 seconds on low speed. The recipe water was then added and mixing continued at medium speed for 2 minutes. The dough chilling step can be eliminated if the dough is maintained at 50°–60° F. during the mixing. The resulting dough was removed from the mixer and placed on a waxed paper surface. The top and bottom surfaces of the dough mass were lightly dusted with flour and the dough was fed through a dough sheeter set for a 7 millimeter thickness. The dough sheet was then cut into 5×5 squares and sheeted again at a 3 millimeter thickness, with the final sheeting operation producing a layer having a thickness of 1.5 millimeters.

EXAMPLE 2

This Example demonstrates the preparation of a reactive dough composition according to the present invention. The following ingredients were chilled to an initial temperature of about 50° F.

| Ingredient | Parts by Weight |
| --- | --- |
| Pie Dough Flour | 38.0 |
| Shortening (Colfax) | 24.5 |
| Water | 31.0 |
| Salt | 0.8 |
| Dextrose (Fine) | 1.3 |
| Yeast Extract (70% Solids)* | 4.4 |

*A standard light colored yeast extract containing about 15% by weight of free amino acids.

The pie dough flour, dextrose and salt were combined in a Hobart paddle mixer bowl and mixed at medium speed for about 2 minutes. The shortening was then added and mixing continued at medium speed for an additional 2 minutes. In a separate operation the yeast extract and recipe water were premixed and this premixture was added to the mixer bowl containing the remaining ingredients and subjected to additional mixing for 1 minute at low speed followed by 2 minutes at high speed until the smooth uniform composition was achieved. This reactive dough composition was designated Composition A.

EXAMPLE 3

This Example demonstrates the preparation of another embodiment of the microwave reactive dough composition according to the present invention. The procedures of Example 2 were repeated utilizing the following ingredients.

| Ingredient | Parts by Weight |
| --- | --- |
| Pie Dough Flour | 38.0 |
| Shortening (Colfax) | 23.7 |
| Water | 30.2 |
| Salt | 0.8 |
| Dextose (Fine) | 1.3 |
| Yeast Extract (70% Solids) | 6.0 |

This composition was designated Composition B.

EXAMPLE 4

This Example demonstrates the preparation of another microwave reactive dough composition according to the present invention. The procedures of Example 2 were repeated utilizing the following ingredients.

| Ingredient | Parts by Weight |
| --- | --- |
| Pie Dough Flour | 38.0 |
| Shortening (Colfax) | 18.5 |
| Water | 27.9 |
| Salt | 0.8 |
| Dextose (Fine) | 1.3 |
| Yeast Extract (70% Solids) | 13.5 |

This composition was designated Composition C.

EXAMPLE 5

This Example demonstrates the preparation and cooking of pies utilizing the compositions prepared in Examples 1-4.

In the first instance, three conventional 8-ounce chicken pies each were produced by combining 38 grams of cooked chicken meat (diced, ½ inch cut) with 143 grams of cooked pie garnish (vegetables in a gravy base), and the meat and garnish were mixed until the meat portion was uniformly distributed. This mixture was then placed in paper pie plates and frozen to a uniform temperature of about −10° F. Next, an approximately 40 gram portion of the unreactive substrate dough sheet prepared in Example 1 was placed on each frozen pie container and the edges of the dough were trimmed and crimped against the container lid. The substrate dough was then brought to a temperature in the range of about 50° to 60° F. and each pie was coated with one of the reactive dough compositions of Examples 2, 3 and 4. In each case a coating of about 8 to 10 grams was uniformly applied over the substrate dough composition. The resulting products were frozen at −10° F.

Each of the above-described frozen pies was individually baked for 8 minutes in a microwave oven at high power setting. The pies were positioned directly in the center of the microwave chamber. A Litton Microwave Oven (Model D1250) rated at 700 watts was used in all tests. The pie containing reactive dough Composition A was placed in a container having an airtight seal over the dough; the product containing reactive dough Composition B was cooked with a non-airtight cover over the dough; and the product containing reactive dough Composition C was baked without a cover. All three products browned sufficiently during the 8 minute microwave cooking period. The resulting pie crust had the appearance, flavor and texture of a freshly baked pie crust and was substantially superior to the product obtained by cooking a standard frozen pie in a conventional oven.

While certain specific embodiments of the invention have been described with particularity herein, it will be recognized that various modifications thereof will occur to those skilled in the art. Therefore, the scope of the invention is to be limited solely by the scope of the appended claims.

We claim:

1. A composite dough material for incorporation into a food product as a crust, said composite dough material comprising an unreactive substrate dough layer which does not brown upon exposure to microwave energy and said substrate dough layer having coated thereon a thin, uniform layer of a reactive dough composition which undergoes chemical surface browning reactions upon exposure to microwave energy, said reactive dough composition comprising a dough-base having added thereto a reducing sugar and an amino acid source the ratio of reducing sugar to amino acid source being sufficient to promote said chemical surface browning reaction when the composite is exposed to microwave energy for a desired period of time.

2. A food product having as one component thereof a crust formed from the composite dough material of claim 1.

3. A process for treating a food product having as a component thereof a crust, said process being effective to render the surface of said crust component brownable upon exposure to microwave energy and decrease the time and temperature necessary to brown the surface of said product in a conventional oven, said process comprising coating the surface of said crust component with a thin uniform layer of a reactive dough composition comprising a dough-base having added thereto, a reducing sugar and an amino acid source sufficient to promote a chemical surface browning reaction when the composite is exposed to microwave energy for a desired period of time.

4. The invention of claim 1, 2 or 3 wherein said reducing sugar is selected from the group consisting of dextrose, maltose, fructose and mixtures thereof.

5. The invention of claim 4 wherein said reducing sugar is dextrose.

6. The invention of claim 1, 2 or 3 wherein said amino acid source is an autolyzed yeast product.

7. The invention of claim 6 wherein said autolyzed yeast product is a yeast extract.

8. The invention of claim 7 wherein said yeast extract is present in said reactive dough composition in an amount of at least about 0.5% solids by weight.

9. The invention of claim 2 or 3 wherein said food product is a meat pie.

10. The invention of claim 2 or 3 wherein said food product is a fruit pie.

11. The invention of claim 3 wherein the browning reaction is enhanced by placing said food product in a covered container and subjecting the container and food product to microwave energy.

12. The invention of claim 1, 2 or 3 wherein said reactive dough composition comprises about 4 to 18% yeast extract, about 25 to 40% flour, about 20 to 40% shortening, about 20 to 40% water, and sufficient reducing sugar to provide a ratio of reducing sugar solids to yeast extract solids of from about 1:1 to 1:10.

* * * * *

UNITED STATES PATENT AND TRADEMARK OFFICE
CERTIFICATE OF CORRECTION

PATENT NO. : 4,448,791
DATED : May 15, 1984
INVENTOR(S) : Roland C. Fuide and Stanley H. Kwis It is certified that error appears in the above—identified patent and that said Letters Patent is hereby corrected as shown below:

Claim 3, line 10, after "source", insert — the ratio of reducing sugar to amino acid source being —.

Signed and Sealed this

Fourth Day of September 1984

[SEAL]

Attest:

GERALD J. MOSSINGHOFF

Attesting Officer

Commissioner of Patents and Trademarks